June 13, 1933.   H. N. OTT   1,914,212
MICROSCOPE
Filed May 9, 1929   2 Sheets-Sheet 1
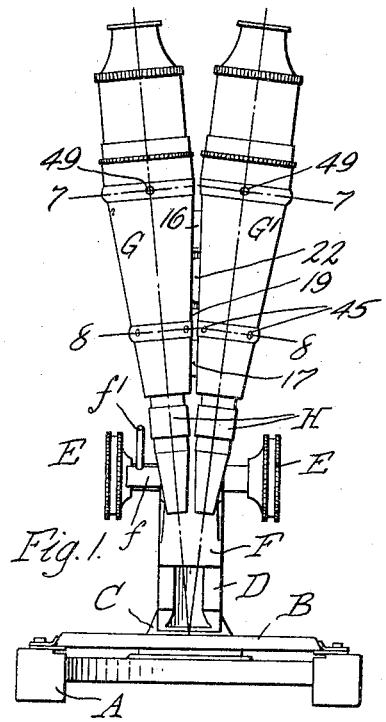
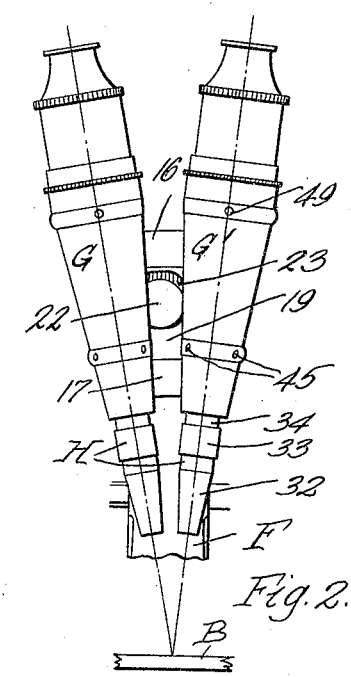
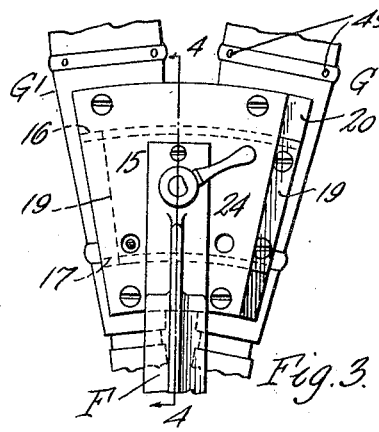
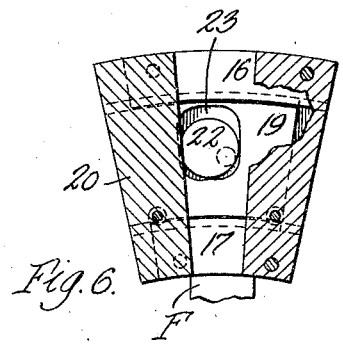
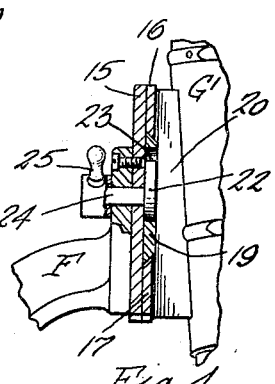
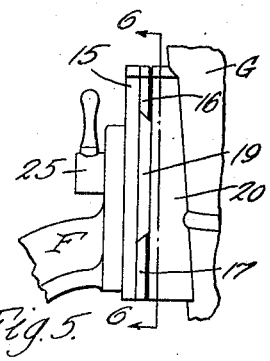
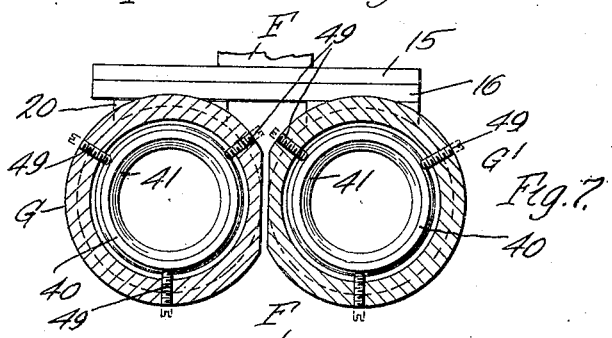
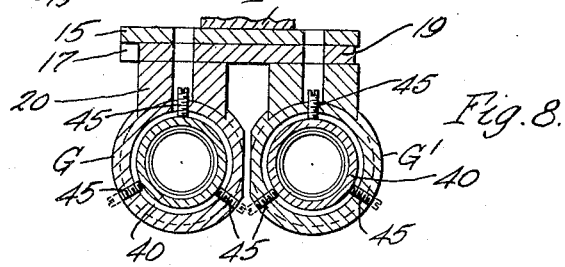
INVENTOR.
Harvey N. Ott
by Parker & Procknow
ATTORNEYS.

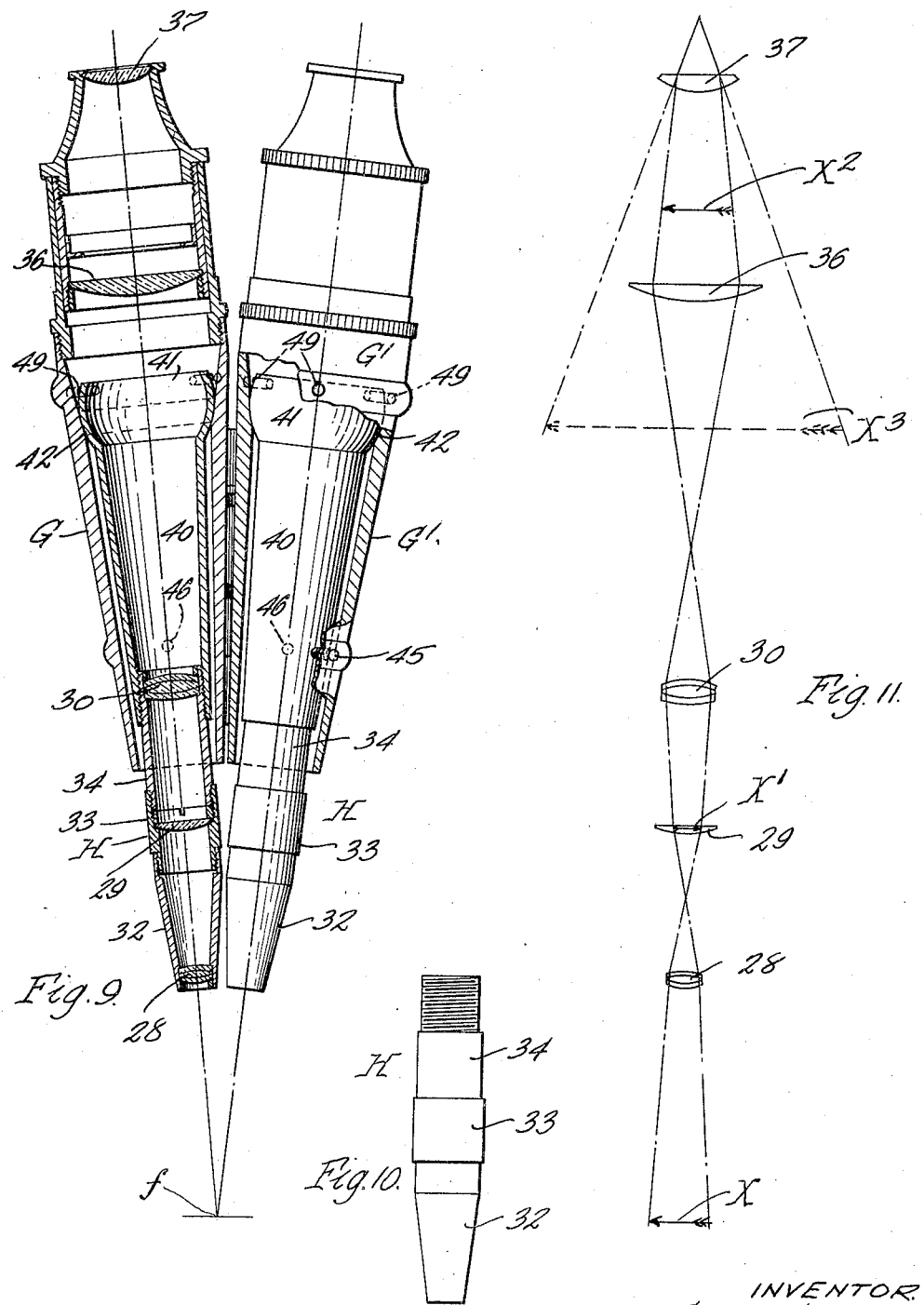

Patented June 13, 1933

1,914,212

UNITED STATES PATENT OFFICE

HARVEY N. OTT, OF BUFFALO, NEW YORK, ASSIGNOR TO SPENCER LENS COMPANY, OF BUFFALO, NEW YORK

MICROSCOPE

Application filed May 9, 1929. Serial No. 361,717.

This invention relates to improvements in microscopes.

In microscopes as heretofore constructed, the erection of the image was ordinarily effected by prisms, and the use of prisms considerably increases the cost of the instrument.

The objects of this invention are to provide a microscope which is so constructed that the erection of the image is effected by the objective which is mounted to be readily removed and replaced by an objective of different power so as to produce a microscope of wide field; also to provide an improved objective for a microscope of this kind; also to provide an improved binocular wide field microscope consisting of two separate and independent microscopes which erect the image and in which no prisms are used; also to provide a binocular microscope with an objective supporting tube which may be adjusted relatively to the body of the microscope to position the lenses in correct optical alignment and relation; also to provide a binocular microscope with means of improved construction for adjusting the body tubes for pupillary distances; and also to improve the construction of microscopes in other respects hereinafter specified.

In the accompanying drawings:

Fig. 1 is a front elevation of a microscope embodying this invention;

Fig. 2 is a fragmentary front elevation thereof showing a different adjustment of the microscope tubes relatively to each other;

Fig. 3 is a fragmentary rear view thereof on an enlarged scale;

Fig. 4 is a sectional elevation thereof on line 4—4 of Fig. 3;

Fig. 5 is a side elevation of the portion of the microscope shown in Fig. 3;

Fig. 6 is a sectional elevation thereof on line 6—6 of Fig. 5;

Figs. 7 and 8 are transverse sectional views on lines 7—7 and 8—8 respectively of Fig. 1, on an enlarged scale;

Fig. 9 is a sectional elevation of the tubes of the microscope, one of the tubes being shown partly in elevation;

Fig. 10 is a view of the objective detached from the microscope; and

Fig. 11 is a diagrammatic view showing the manner of the functioning of the lenses of the microscope.

A represents the base of the microscope which may be of any suitable or usual construction and which has a stage B secured thereto. C represents the usual pillar rigidly mounted on the rear part of the base, the pillar being provided with suitable guide surfaces on which the slide D is adjustable vertically, this adjustment being effected in any suitable manner, for example, through a rack and pinion mechanism (not shown) of which the pinion is connected with the usual discs or buttons E for turning the same. The vertically adjustable slide D is provided with another set of guide surfaces on which the lower portion of the arm F of the microscope may be secured in any suitable or desired manner, for example, by means of a clamping screw $f$ having an arm $f'$ secured thereto to facilitate turning of the clamping screw. The arm F extends upwardly and forwardly and is secured at its upper end to a supporting plate or member 15 on which the body tube or tubes of the miscroscope are mounted.

All of these parts have heretofore been used in connection with various types of microscopes and constitute no part of this invention.

The microscope shown in the drawings is a binocular one having two complete tubes and lens systems, G and G' representing the tubes, which may be constructed in parts secured together in the usual manner. These two tubes must be adjustable relatively to each other for pupillary distances and in the particular construction shown the tube G' is rigidly mounted on the plate 15, preferably at such an angle that when the tube G is adjusted for the same angle, the tubes will be positioned for the average pupillary distance. The adjustment of the tube G is preferably effected as follows:

The plate 15 has a pair of guide plates 16 and 17 secured to the front face thereof and having undercut guide faces which are arc-shaped, the center of curvature of the arcs being at the focal point $f$ of the microscope. A plate 19 is mounted to slide between the fixed guide plates 16 and 17 in a small arc or circle about the focal point, and the tube G is rigidly mounted on the movable plate 19, a bracket portion 20 being interposed between the plate 19 and the tube G.

The adjustment of the tube G with reference to the fixed tube G′ may be effected in any suitable or desired manner. In the particular construction shown, this is effected by means of an eccentric or cam 22 arranged in a slot or cut-out portion 23 of the adjustable plate 19, and the eccentric 22 is mounted on a pin 24 which bears in a hole extending through the fixed plate 15 and the upper part of the arm F of the microscope, and if desired, an adjustable knob or handle 25 may be arranged in the rear end of the pin 24.

Consequently, by turning the pin 24, the eccentric 22, which engages the opposite sides of the slot 23 in the plate 19, causes this plate to move in either direction between the guide plates 16 and 17. Other means for adjusting one of the tubes relatively to the other may be employed and it will be understood that, if desired, both of the tubes of the microscope may be adjusted relatively to each other.

H represents the objective of each microscope tube, which comprises a front lens 28, which, for example, may be a triple lens, an intermediate lens 29 and a back lens 30 which may also be a triple lens or a lens of other type. These lenses are spaced much further apart than is usually the case in microscope objectives, and the lenses are so formed that the image is reversed in the objective, by causing the light rays to cross between the front and middle lenses, and the back lens is so formed as to cause the light rays to cross in passing to the eye piece. By this arrangement, the image is erected by the objective and this arrangement also results in a wider field than can be produced if the image is erected in the eyepiece. Fig. 11 illustrates diagrammatically the paths of light rays through the objective.

As is the usual custom in the construction of objectives, the mounting for the objective lens is formed in three parts or tubular sections 32, 33 and 34, each of which contains one of the lenses, the several parts of the objective holder being secured together by screw threads.

The light rays after leaving the back lens of the objective, pass through the field lens 36 and then through the eye lens 37 of the ocular, the path of light passing through these lenses being also illustrated diagrammatically in Fig. 11.

The mounting of the objectives as described has the advantage that one set of objectives can conveniently be removed and replaced by another of different power.

The objective mounts are secured to the lower ends of adjustable inner tubular members 40 arranged within the microscope tubes and these members are made adjustable so as to place the objective of each microscope into proper optical relation to the eye piece and to the other microscope body of a binocular microscope. In the particular construction shown for this purpose, the inner tubular members are provided at their upper ends with means for forming pivotal or ball and socket connections with the body tubes of the microscope and for this purpose the upper ends of the inner tubular members are provided with enlarged portions 41, the outer surfaces of which are partly spherical in form. The body tubes of the microscope are provided with corresponding spherical surfaces 42. This arrangement makes it possible for the lower ends of the inner tubular members 40 and the objectives mounted thereon to be adjusted about the center of the spherical faces 42.

In order to fit the inner tubular members 40 into their correct positions, the body tubes of the microscope are provided near their lower ends with two or more adjusting screws 45 which extend through threaded holes in the body tube and engage the outer surface of the inner tubular members. Consequently, by turning these screws 45 the lower ends of the inner tubular members 40 can be adjusted as may be necessary.

The inner tubular members 40 are held in their operative positions in which the spherical faces of the enlarged portions 41 thereof bear against the spherical faces 42 of the body tubes by means of screws 49, which may be tightened after the inner tubular members 40 have been adjusted.

Any other means for adjusting the inner tubular members 40 and holding the same in place may be employed. The adjusting of these tubes is preferably effected by the manufacturer of the microscopes and when the objectives are once set in their correct positions, no further adjustment thereof is necessary. In fact, after the adustment has been completed, the ends of the screws which are shown in broken lines in Figs. 7 and 8, may be cut off to prevent changing of the adjustment. Initial adjustment of the objectives at the factory is, however, generally necessary to compensate for slight variations in the lenses.

Referring to the diagrammatic view in Fig. 11, X represents the object to be magnified and X′ shows the reversed position of the rays of light from the object X as they would be in passing through the middle lens 29 of the objective. $X^2$ represents the image in the eye piece as it is erected, and $X^3$ represents the image as it appears to a person looking through the microscope. A wide field together with erection of the image is attained by so forming the lenses of the objective that the rays of light from the object come to a focus at or near the middle lenses of the objective as indicated at X' and again at X² between the back lens of the objective and eye lens of the eye piece of the type indicated in Fig. 11.

Microscopes of the construction described are particularly desirable where a comparatively low power and wide field is desired, together with erection of the image, and where the expense of prisms is to be avoided. The microscope is, therefore, desirable for use in connection with dissection and for other purposes where an erected image is desired. The microscope described, having two complete body tubes and objectives permits a greater amount of light to pass through each tube than is ordinarily the case.

I claim:

1. A binocular microscope having two complete microscope tubes, means for supporting said tubes including arc-shaped guides having their center of curvature coincident with the focal point of the microscope, a part on one of said tubes engaging with said arc-shaped guides, and the other tube being mounted in fixed relation to the microscope, and means engaging said part for effecting relative adjustment of said tubes on said arc-shaped guides.

2. A binocular microscope having two complete microscope tubes, a base having an upwardly extending part mounted thereon on which one of said tubes is secured, arc-shaped guides on said part and having their center of of curvature coincident with the focal point of the microscope, an adjustable member arranged between said guides and on which the other tube of said microscope is mounted for adjustment about said focal point, a slot in said adjustable member, and an eccentric pivoted on said upwardly extending part and engaging in said slot to effect adjustment of said microscope tubes relatively to each other for pupillary distances.

3. A binocular microscope having two complete microscope tubes, a base having an upwardly extending part mounted thereon on which one of said tubes is fixedly secured, arc-shaped guides on said part and having their center of curvature coincident with the focal point of the microscope, an adjustable member arranged between said guides and on which the other tube of said microscope is mounted for adjustment about said focal point, and means cooperating with said tubes to move said other tube into different angular relations to said first mentioned tubes.

4. A binocular microscope having two complete microscope tubes, a base having one of said tubes secured in fixed relation thereto, guide means connected with said base and to which said other tube is secured for holding said other tube in different angular positions in which the optical axis of said other tube passes through the focal point of the microscope, and means for adjusting said other tube into different angular relations to said fixed tube.

HARVEY N. OTT.